June 8, 1937.  L. FERENCI  2,082,945
BREAD SLICING AND WRAPPING MACHINE
Filed Feb. 19, 1932  5 Sheets-Sheet 1

INVENTOR
Lester Ferenci
BY Sydney Prescott
ATTORNEY

June 8, 1937.                L. FERENCI                    2,082,945
              BREAD SLICING AND WRAPPING MACHINE
                    Filed Feb. 19, 1932        5 Sheets-Sheet 3

INVENTOR
Lester Ferenci
BY
Sydney Prescott
ATTORNEY

June 8, 1937. L. FERENCI 2,082,945
BREAD SLICING AND WRAPPING MACHINE
Filed Feb. 19, 1932 5 Sheets-Sheet 4

INVENTOR
Lester Ferenci
BY
Sydney Prescott
ATTORNEY

Patented June 8, 1937

2,082,945

UNITED STATES PATENT OFFICE 2,082,945

BREAD SLICING AND WRAPPING MACHINE

Lester Ferenci, Brooklyn, N. Y., assignor to American Machine & Foundry Company, a corporation of New Jersey Application February 19, 1932, Serial No. 594,101

43 Claims. (Cl. 93—2)

This invention relates to wrapping machines, particularly to machines for wrapping bread and the like. Its general object is to produce a machine of this nature which is simpler and cheaper than the high priced high speed two man operated machines commonly used in this art, and which can be tended by one man instead of two, and to produce as high a quality of work while retaining substantially all the convenience, ease of adjustment and ranges of sizes handled by the more expensive machines.

To this end, it is an object of the invention to provide an improved mechanism for spreading the paper in the path of the loaf.

Still another object is to provide such a machine which can be readily converted in the bakery between runs to slice and/or wrap bread loaves.

Another object of the invention is to simplify machines of this type by eliminating all moving tuckers requiring some separate operating structure. For this purpose it is an object of the invention to combine one set of tuckers with the lifter table for movement therewith.

Another object is to make such a machine exceptionally easy to adjust for a run of different sized loaves by means which through one manual operation adjusts a number of folding and sealing parts at once.

It is an object of this invention to provide a reliable and simple conveyor system which will receive and deliver the loaves at the same end and at convenient levels to be handled by one man; furthermore this conveyor system is arranged so that it will without change forward loaves through a slicer when the slicer is used. A feature of this conveyor system is that the loaves are moved continuously not intermittently on the main horizontal conveyors.

Still other objects are to provide: A safety device by which the slicer cannot be operated when not in slicing position; a simple no package-no wrapper device; and an improved paper feeding mechanism. With these and other objects not specifically mentioned in view, the invention consists in certain constructions and combinations which will be hereinafter fully described and then specifically set forth in the claims hereunto appended.

The loaves or other articles to be wrapped and sliced are placed on continuously moving endless conveyor chains which are equipped with push bars in such a manner that each push bar carries along one loaf at a time, thus eliminating the necessity of devices for separating the loaves in the machine. From the conveyor chain the loaves are elevated to a higher level on which a reciprocating plunger pushes the same through the slicing device upon a lifter which raises the loaf to a still higher level where the loaf, which has been engaged with and been partially enwrapped in a suitable wrapper of waxed paper fed to it and cut from a roll in the machine, is pushed past suitable folder and heater plates for completing the folding of the wrapper and sealing the same, the finished package being discharged upon a delivery belt. The arrangement of the machine in different levels has for one of its objects the reducing of the floor space occupied by the machine.

The paper is fed intermittently, the paper feed mechanism being operated from an eccentric through a ratchet. As the feed rollers and knife are stationarily mounted they require no adjustments. The only adjustment provided on the paper feed is to set the length of the paper required by different sizes of loaves to be wrapped. The adjustment of the whole machine for loaves of different sizes is very simple as the folder plates, heater plates, side guards and belts are all attached to the same pair of movable supporting bars adjusted by a handle on a right and left hand screw. Only the end tuckers which are mounted on the lifter require separate adjustment.

The slicing device is mounted on two slidable rods and is readily brought out of the path of the loaf if desired by simply operating a crank handle. An easily attachable table or bridge is then used to cover the slicer space. A locking device is provided to make this manipulation of the slicer impossible while the parts of the machine on the slicer level are in operating position.

The slicer itself is mounted on rubber cushions to eliminate any vibration or noise. The slicer is equipped with a separate motor drive provided with a standard safety switch so that the motor can drive the slicer only when the latter is in the slicing position.

Another important feature on this machine is that a feeler or registering finger placed in the path of the incoming loaves operates a control or knockout so that no paper is fed if one or more of the spaces on the loaf-conveyor are empty.

In the accompanying drawings which form a part of this specification and in which like characters of reference designate the same or like parts.

In carrying the invention into effect there is provided means for forwarding articles to be sliced and wrapped, slicing means, means actuated by engagement with an article on said forwarding means to feed a predetermined length of material from a reel of wrapping material, means for severing the web of wrapping material at a suitable distance from its leading end to form a wrapper blank, means for positioning the severed wrapper blank to be engaged by a sliced article, mechanism for pushing an article from said forwarding means through said slicing means into engagement with said wrapper blank to partially enwrap it about the circumference of the sliced article, means acting to complete the circumferential enwrapping of the article, and means for folding the end flaps of the wrapper blank to complete the wrapping of the sliced article. In the best forms of construction contemplated said forwarding means includes a horizontal conveyor, a reciprocating elevator for receiving the articles directly from said conveyor at one level and lifting them to a delivery level, and said slicing means includes a slicer frame, oscillating knife frames carried by the slicer frame, eccentrics on the shaft of the motor connected to the knife frames, manually operable means to move the slicer frame in and out of operative position, and means for locking the slicer frame in operative or non-operative position. In the preferred embodiment of the invention, the wrapping material feed includes a pair of cooperating feed rolls, a drive shaft, mechanism for driving said feed rolls from said drive shaft, and a feeler arranged to engage the advancing articles in said forwarding means and connected to said mechanism to control the same, and said severing means includes a ledger plate, a knife, a cam, means actuated by said cam to cause the knife to cut off the wrapping material on the ledger plate, including a yielding connection, and manually operable means for actuating said knife to sever the wrapping material. In the best forms of construction contemplated also the wrapper positioning means includes a reciprocating article lifter having a guide through which the wrapping material is fed, means for holding a portion of the wrapping material stationary while said lifter is being lowered to partially withdraw it from said guide so that when the article is pushed through the slicer onto the lifter the wrapping material will be partially enwrapped about the circumference of the article, and said means for completing the circumferential enwrapping of the article includes a folder loop adapted to draw the wrapping material over the top of the article so that the upward movement of the lifter will fold the wrapping material over the remaining side of the article. In the preferred embodiment, also, the means for folding the end flaps of the wrapper includes top end fold plates, side end fold plates, bottom end fold plates, and adjustable supporting bars on which said plates are mounted. These various means and parts may be widely varied in construction within the scope of the claims for the particular machine selected to illustrate the invention is but one of many possible concrete embodiments of the same. The invention, therefore, is not to be restricted to the specific construction shown and described.

Referring to Figs. 1 to 4, the wrapping machine consists of two side frames 20 and 21 and of two end frames 22 and 23. The entire machine, except the slicer, is driven by a motor 24 mounted on a bracket 25 supported by end frame 22. Motor 24 is equipped with a gear 26 driving a gear 27 on drive shaft 28 having a standard friction clutch, not shown, which is operated by a fork lever 29 loosely mounted on a longitudinal supporting shaft 30 mounted in end frame 22 and lug 31. Lever 29 is equipped with an arm 32 actuated by a cam piece 33 on hand lever 34 pivoted on stud 35. Drive shaft 28 also carries a gear 36 driving another gear 37 mounted on cam shaft 38 supported in side frames 20 and 21.

The loaves L, or other articles to be wrapped, are placed on a feed table 39 supported by transverse shafts 40, 41, and 42. Shaft 40 is mounted in bearings of side frames 20 and 21 while shafts 41 and 42 are at each end supported in lugs 43 and 44 respectively mounted on shafts 30 and 45. The latter supporting shaft 45 is mounted in end frame 22 and lug 46, Figs. 1 and 4.

Each loaf is individually advanced by one of a number of pusher bars 47 mounted on a pair of lugs 48 on two parallel endless conveyor chains 49 which are driven from sprockets 50 on shaft 40 over idler sprockets 51 on shaft 42. Sprocket 50' on shaft 40 is driven through a chain 52 from a sprocket 53 mounted on the cam shaft 38. Chain 52 is led over an idler sprocket 54 and also drives a sprocket 55 which is mounted on shaft 56 supported by side frames 20 and 21.

The loaves L are pushed by the pusher bars 47 onto an elevator or lifter plate 57 carried by bearing brackets 58 which are supported by a rod 59 through which the lifter plate 57 is elevated by an arm 60 attached to a cam lever 61 pivoted on shaft 28 and actuated through a roller 62 from a double cam 63 on shaft 38. Rod 59 is furthermore equipped with a guide lever 64 pivoted on a stud 65 of side frame 20. Upon a loaf arriving on lifter plate 57, the latter is raised to the higher level of the slicing device into which the loaf is then pushed by a slotted pusher arm 66 mounted on a guide bracket 67 slidably mounted on shafts 68 which are held stationary by a shaft 69 on one end and a bracket 70 on the other. Bracket 70 is supported by a shaft 71 mounted in side frames 20 and 21. To guide bracket 67 is attached a gear rack 72 operated from a gear 73 mounted on shaft 74 supported from bracket 70 and carrying another gear 75 driven alternately in opposite directions by a reciprocating gear rack 76 operated by a lever 77 pivoted on shaft 78 on side frame 20. Lever 77 is actuated by a cam lever 79 and shaft 78 having a roller 80 engaging with a cam track of cam 63. In order to secure engagement of rack 76 with gear 75, the former is held by a guide roller 81 pivoted on stud 82.

Figures 1, 15:
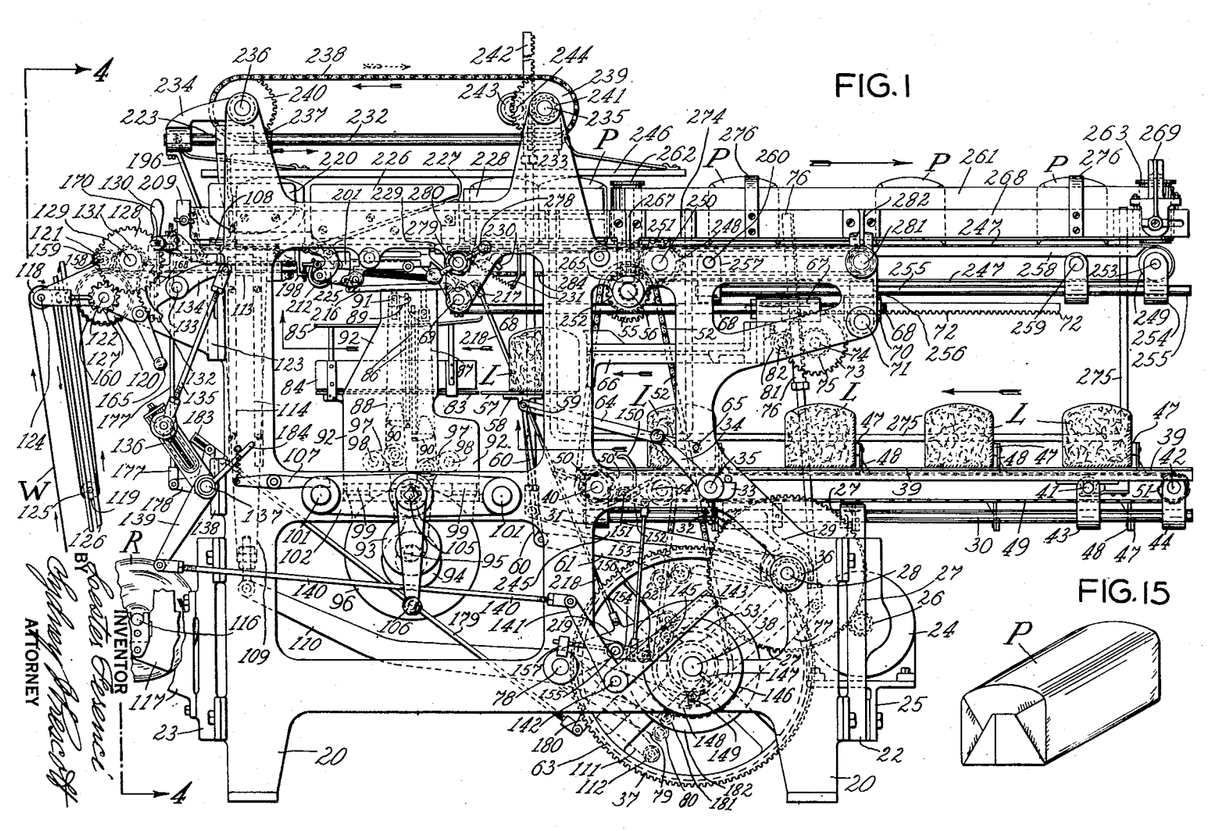
Fig. 1 is a side elevation of the combined slicing and wrapping machine.
Fig. 15 is a perspective view showing the appearance of a finished package produced by the combined slicing and wrapping machine.
Figures 4, 16, 17:
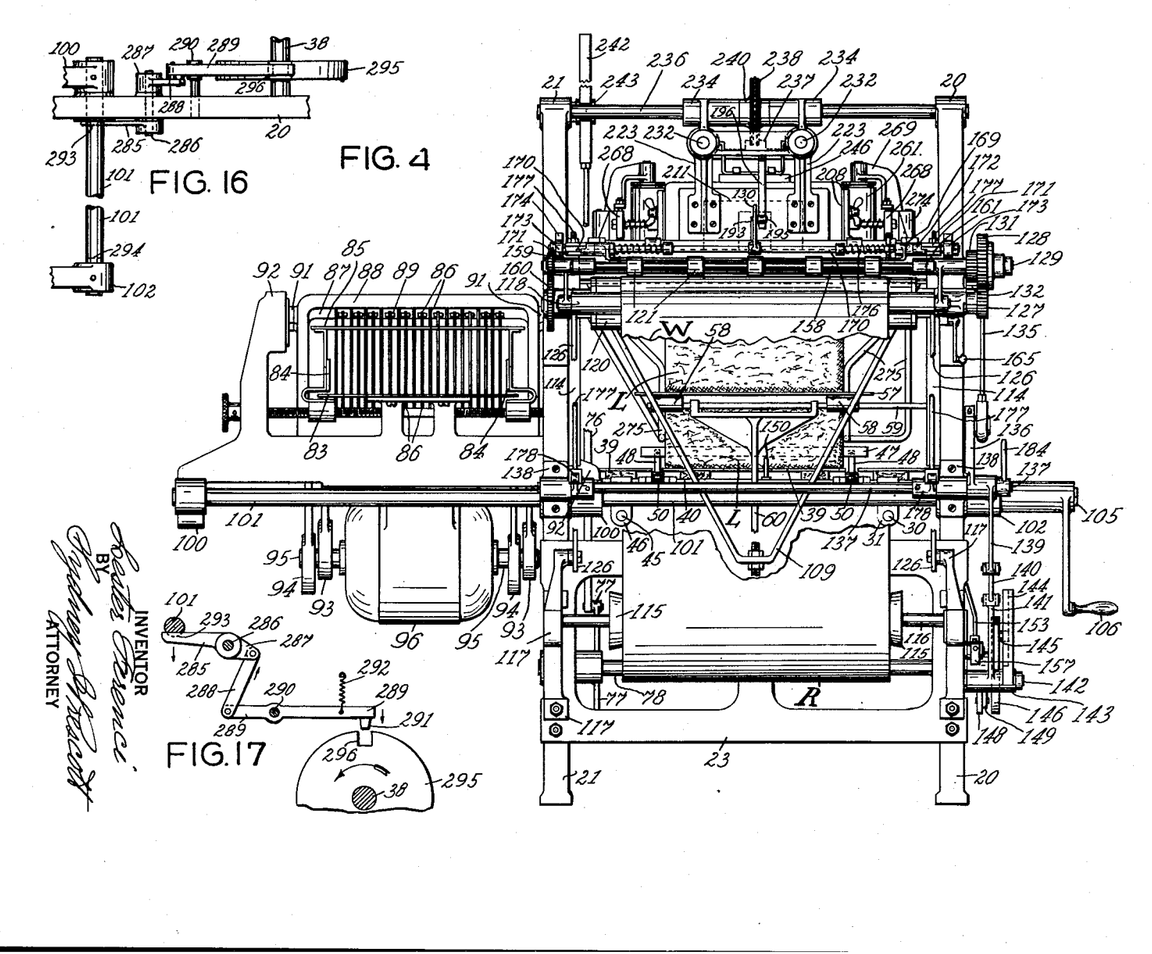
Fig. 4 is an end elevation of the machine seen from line 4—4 of Fig. 1 with the slicer in non-operative position.
Fig. 16 is a plan view of the slicer locking device.
Fig. 17 is a side elevation of the same.

Pusher arm 66 takes the loaf L from the lifter plate 57 and, advances it across the slicer table 83, Figs. 1 and 4, which is equipped with adjustable side guards 84 and top guards 85, pushing it through the vertically oscillating knife or saw blades 86 of the slicing mechanism which are disposed in slots of the slicing table and arranged in two knife frames 87 and 88 in such a manner that their cutting edges are staggered in the direction of the advancing movement of the loaf, the blades of rear frame 88 entering the loaf shortly after the rear edges of the blades of forward frame 87 have passed into the advancing loaf. With this arrangement, the advantage is gained that the side pressure on the blades 86 in each set is sustained by the thickness of two slices of bread, since the blades on each frame are spaced the thickness of two slices and the blades on one frame are staggered the thickness of a slice with respect to the blades on the other frame, thus eliminating crooked or uneven cuts.

Pins on the upper ends of the blades 86 are held in lugs 89 of the frames 87 and 88 while pins on their lower ends engage with grooves in tension levers 90, so that each blade has the proper permanent tension. Frames 87 and 88 on their upper ends are swingably mounted in guide shoes 91 slidably supported in slicer frame 92. The lower ends of frames 87 and 88 are pivoted on eccentric rods 93 and 94 mounted on eccentrics on shaft extension 95 of a motor 96 mounted on the bottom of slicer frame 92. This portion of the slicing mechanism forms the subject matter of Patent #2,011,043, granted August 13, 1935 on my copending application S. N. 533,829, filed April 29, 1931.

To frames 87 and 88 and eccentric rods 93 and 94 are also pivoted guide levers 97 loosely mounted on studs 98 in slicer frame 92. The latter is mounted on rubber cushions 99 in supporting lugs 100 fastened to guide rods 101 slidably mounted in side frames 20 and 21. The guide rods 101 on their ends are connected by a bracket 102, Fig. 2, carrying a threaded shaft 103 engaging in a threaded bearing 104 mounted in side frame 20. Shaft 103 has a square extension 105 carrying a hand crank 106. By turning the crank 106, the rods 101 thus will move in or out, carrying the slicer frame 92 with them, thereby enabling the whole slicer to be moved out of the path of the loaf if desired. Frame 20 on one side carries a resiliently mounted lock lever 107 engaging in one or the other of the two notches in the top of one of the rods 101 when either in slicing or in non-operative position, thereby holding the slicer mechanism securely in either position. The slicer is equipped with a standard safety switch, not shown, which prevents the slicer motor from being started when the slicer is not in working position.

From the slicer table 83 the loaf L is pushed by arm 66 onto a lifter 108, Figs. 1 and 4, mounted on a supporting bracket 109 actuated from a lever 110 pivoted on shaft 78 and having an extension 111 engaging by means of a roller 112 in a track of cam 63. Lifter 108 is equipped with two guide shoes 113 slidably mounted between guide bars 114 on side frames 20 and 21. By pushing the loaf onto the lifter 108, the loaf engages with the waxed paper or other wrapping material as will be now described.

The paper web W is fed from a reel R, Fig. 4, held by two cones 115 mounted on a shaft 116 supported in bearings of brackets 117 fastened to end frame 23. The paper web W from the reel R passes over an idler roller 118 and a floating roller 119, Fig. 1, into the space between the feed rollers 120 and 121. Feed roller 120 is mounted on a shaft 122 supported by brackets 123 attached to side frames 20 and 21. Idler roller 118 is mounted on a shaft 124 also supported by brackets 123. Floating roller 119 is mounted on a shaft 125 guided between bars 126 fastened to brackets 117 and 123. Shaft 122 carrying feed roller 120 has a gear 127 driven by a gear 128 mounted on shaft 129. The latter also has mounted thereon a gear 131 driving it through a standard one-way ball or roller clutch, not shown, thus allowing shaft 129 to turn in one direction only as the gear 131 is actuated from a rocking gear segment 132 pivoted on stud 133. Segment 132 has an arm 134 which, through a connecting rod 135, is adjustably connected with a swinging lever 136 pivoted on shaft 137 supported in bearings 138 mounted on side frames 20 and 21. Swinging lever 136, Figs. 1, 2, and 4, has an arm 139 connected through rod 140 to one arm of a bell crank lever 141 pivoted on a stud 142 mounted in side frame 20. The other arm 143 of lever 141 is provided with a longitudinal track 144 in which engages a roller 145 pivoted on a disc 146 loosely mounted on cam shaft 38. The hub of disc 146 is equipped with a pin 147 through which it is driven by a lever 148 pivoted to a crank 149 mounted on shaft 38. As long as lever 148 engages with the pin 147, the disc is driven thus operating the paper feed in the manner described. But if a loaf is missing in the feed, it is desirable that the paper feed mechanism stop to avoid wasting of the paper. This is achieved by placing a feeler or registering finger 150 in the path of the incoming loaf forwarded by the conveyor chains 49.

Figure 5:
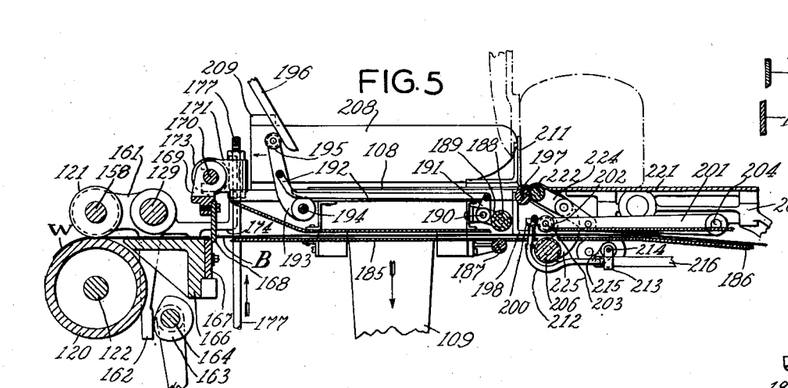
Figs. 5 to 11 are detail side elevations showing the successive steps in making the bottom fold.

The feeler or registering finger 150, Fig. 1, is mounted on a pivot 151 equipped with a lever 152 which is connected through a rod 153 with a lever 154 pivoted to a stud 155. Lever 154 carries a roller 156 which, in the down position of lever 154, lies directly in the path of the swinging lever 148. When a loaf passes the registering finger 150 the latter will be pressed down by the weight of the loaf, thereby, through rod 153, lifting the lever 154 so that roller 156 is out of the path of lever 148, the latter remaining in engagement with pin 147. If there is no loaf to press down the registering finger 150, the lever 154 will remain in its down position and roller 156 will then trip the lever 148 out of engagement with pin 147, thereby stopping the paper feed. Lever 148 on its next turn automatically again engages with pin 147 if the roller 156 is out of the way, otherwise the latter will keep disengaged. In order to operate the finger 150 by the slightest pressure, the lever 154 is equipped with a balance weight 157. The feed roller 12, Figs. 1, 2, 4, and 5, which is made in sections to effect better contact with the paper, is mounted on a shaft 158 which carries a gear 159 driven from a gear 160 on shaft 122, the shaft 158 being mounted in swingable bearing bracket 161 pivoted on shaft 129. The brackets 161 have depending arms 162 engaging with a cam 163 on shaft 164 movable by a hand lever 165, as shown in Fig. 5. This arrangement is made for lifting the top feed roller 121 for threading in the paper web W by hand when a new paper roll is started.

Figure 2:
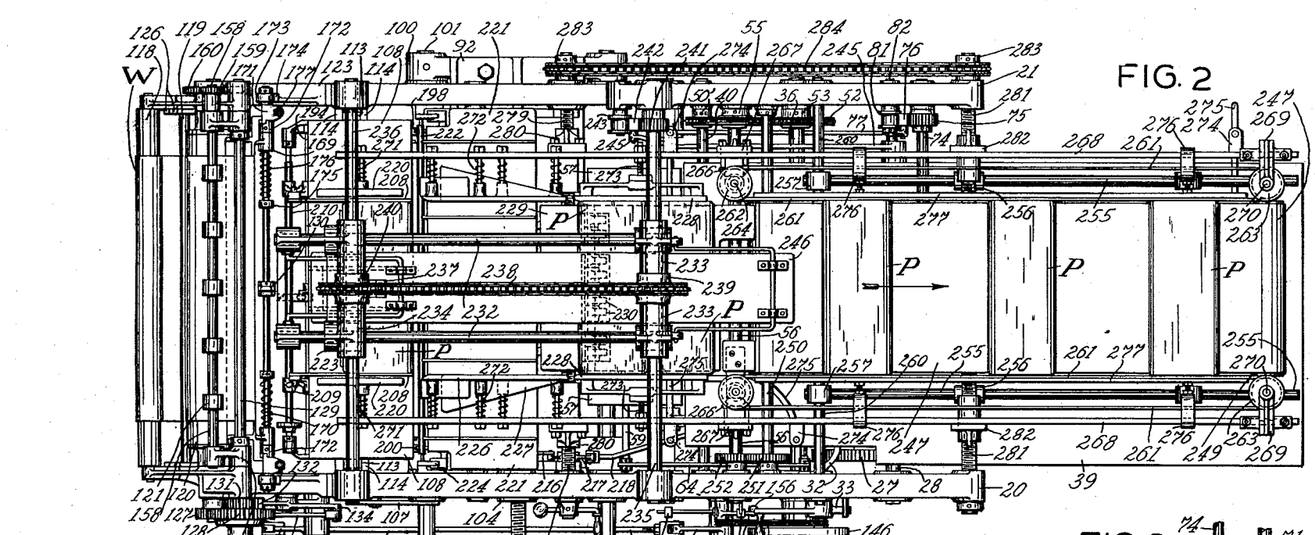
Fig. 2 is a top view of the same.
Figure 3:
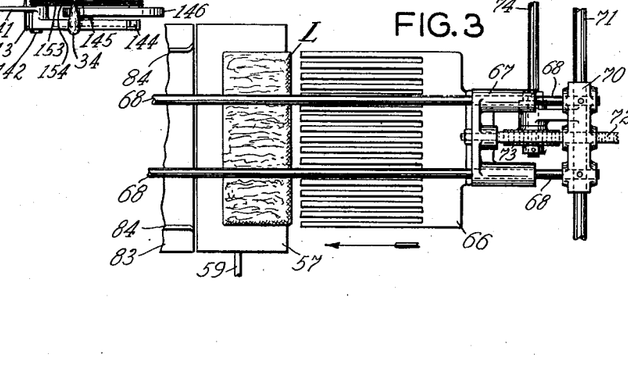
Fig. 3 is a detail plan view of the loaf pusher mechanism for moving the loaf through the slicer.

The web W is fed by the rollers 120 and 121 onto a cutting table 166, Fig. 5, carrying a ledger plate 167 along which the web is cut by a knife 168 adjustably mounted in bracket 169 pivoted on a shaft 170 supported by forked brackets 171 provided with axial lugs engaging with grooves in the adjacent faces of sleeves 172, Fig. 2 and Fig. 4, fixed on shaft 170. On its ends the shaft 170 has rollers 173 bearing against guide lugs 174. Shaft 170 also carries fixed collars 175 to which are fastened torsion springs 176 connected to knife bracket 169. This spring mounting has the object of producing continuous tension of the knife 168 against the ledger plate 167, thereby assuring a clean cut and automatic sharpening of the knife during operation.

Shaft 170 is equipped with a handle 130 for the purpose of disengaging shaft 170 from forked brackets 171 thereby enabling the entire knife mounting to be removed for ready replacement of the knife. By pressing down hand lever 130, shaft 170 turns the sleeves 172 thus disengaging the couplings between sleeves 172 and 171 and permitting the shaft 170 to be removed from the brackets 171.

The cutting mechanism is operated through rods 177, to which the forked brackets 171 are fastened, by bell crank levers 178, Fig. 1, mounted on shaft 137. Bell crank levers 178 are actuated through rod 179 from bell crank lever 180 engaging by means of roller 181 with cam 182. In order to enable the cutting of the paper by hand, in adjusting the machine, etc., the upper end of rod 179 engaging with lever 178 is equipped with a housed spring 183, Fig. 1, which permits lever 178 to be operated independently of the position of cam 182. For hand cutting a hand lever 184 is mounted on shaft 137. The only adjustment necessary in this paper feed and cutting device is the adjustment for different lengths of paper required by different sizes of loaves or other articles. This adjustment is performed by simply varying the attachment point of connecting rod 135 on lever 136 by means of the screw adjustment on lever 136. All other parts remain in their fixed position.

The web W is fed over the cutting table 166 and under the open knife 168 into a paper guide 185 mounted on the lifter 108 and through guide 185 into a second paper guide 186 mounted on the frame of the machine. After a length of paper sufficient for wrapping one package has been fed into the guides 185 and 186, the web W is cut, leaving the wrapper blank B in the guides 185 and 186.

Figure 6:
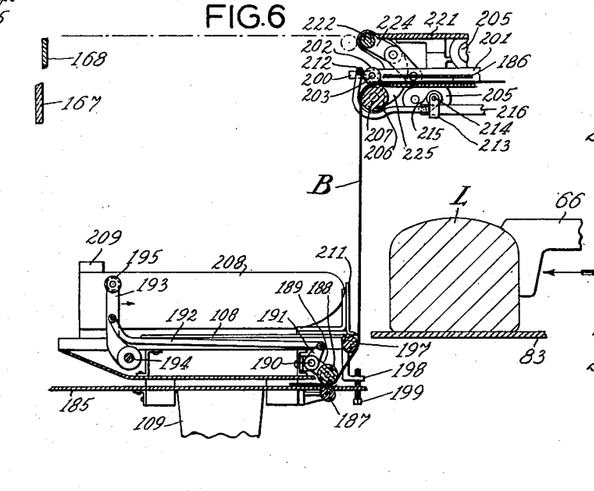
Figure 7:
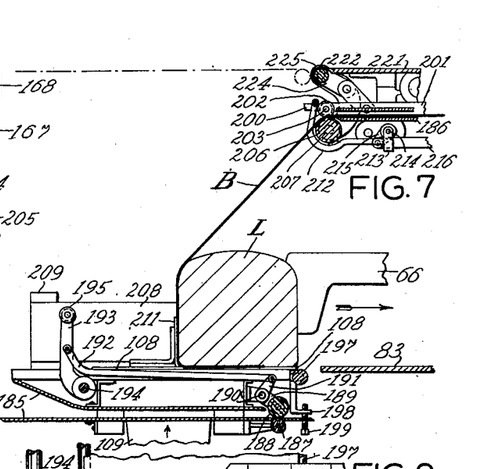
Figure 8:
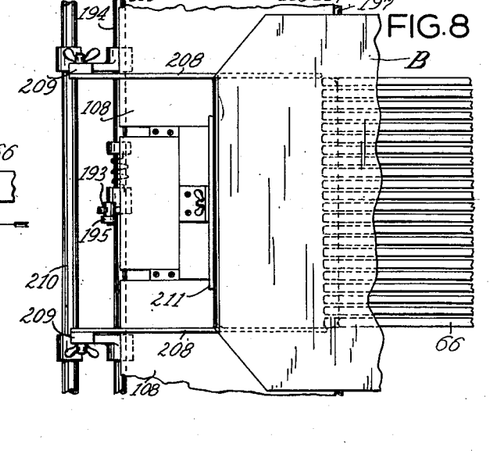

Paper guide 185, Figs. 5 and 6, has a bottom guide roller 187 to which, upon the descent of the lifter, the paper is held by a clamp roller 188 pivoted on an arm 189 mounted on stud 190. The latter is operated through a lever 191 by a rod 192 fastened to an arm 193 pivoted to a rod 194 tensioned by a spring on rod 194 to cause the roller 188 to clamp the paper and equipped with a roller 195 which engages with a guide bar 196 when the lifter is in its upmost position, thereby lifting roller 188 and allowing the web W to pass freely, Fig. 5. Whenever the lifter moves downward and roller 195 leaves guide bar 196, roller 188 clamps the paper blank B to roller 187, Fig. 6. The lifter plate 108 is equipped with a guide roller 197 and two lifter lugs 198 carrying lifter screws 199. While lifter 108 is in its uppermost position, Fig. 5, screws 199 engage with lugs 200 thereby lifting levers 201 carrying a clamp roller 202 pivoted on studs 203 carried by the levers 201. The levers 201 are pivoted on studs 204 mounted in a bracket 205 supported by side frames 20 and 21. Bracket 205 carries another guide roller 206 pivoted on stud 207. While the levers 201 are raised, the paper web W passes into paper guide 186 between rollers 202 and 206. As soon as lifter 108 descends and screws 199 disengage from lugs 200, clamp roller 202 will fall on roller 206, thereby clamping the paper between them. The paper blank B then is held tightly between rollers 202 and 206 while the lifter 108 descends and is partly drawn out of paper guide 185 from between rollers 187 and 188 which are designed to clamp the paper with but a slight pressure, Figs. 1 to 6.

Figures 9, 10, 11:
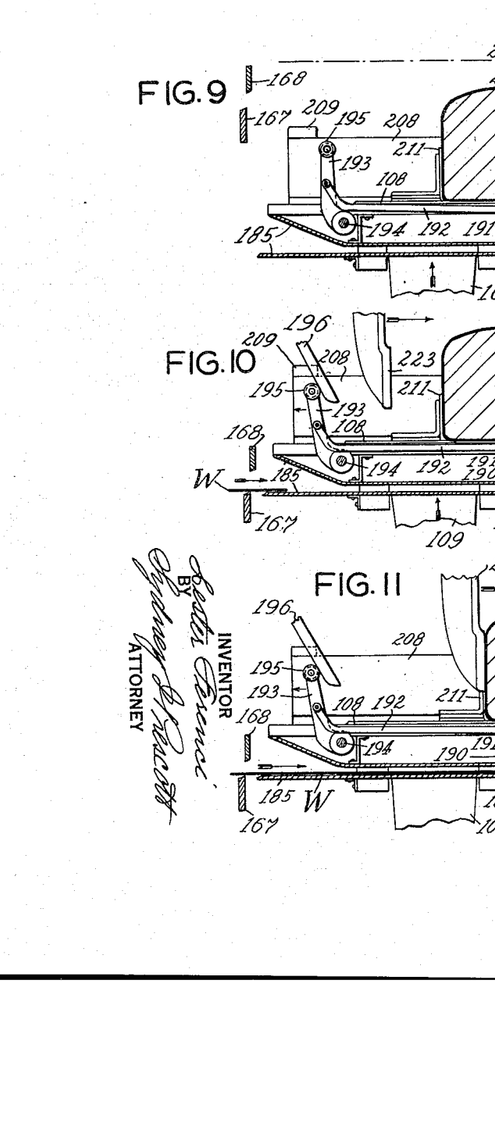
Figure 12:
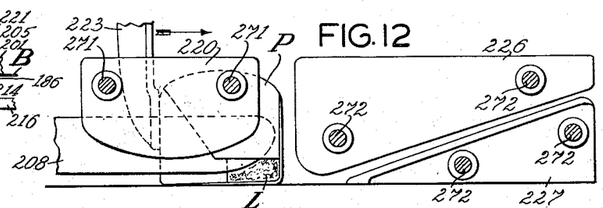
Figs. 12 to 14 are detail side, end and plan views respectively showing the manner of making the side fold.
Figures 13, 14:
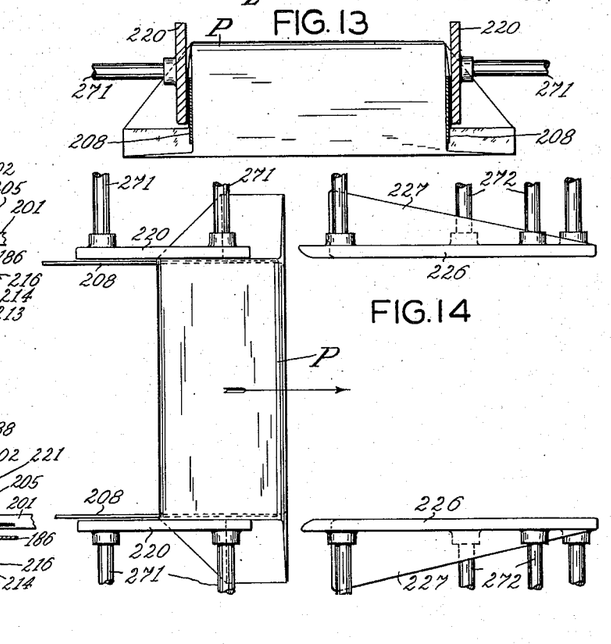

Lifter 108 carries the side tucker plates 208, Figs. 5 to 8, mounted on brackets 209 supported by rods 194 and 210, both slidably attached to the lifter plate 108 which carries also a yieldingly mounted bottom fold plate 211 such as described in the patent to H. Y. Armstrong, No. 1,626,379, granted April 26, 1927. Lifter plate 108 descends to the level of the slicing table 83 on which level the arm 66 pushes the sliced loaf from the table 83 onto the lifter plate 108. In doing so, the loaf is pressed first against the bottom fold plate 211, thereby clamping the paper between plate 211 and the loaf L, and in advancing further on the lifter plate 108, the remaining end of the paper blank B in the guide 185 is drawn out from between the rollers 187 and 188 and folded around the bottom of the loaf, Fig. 7, and the sides of the wrapper are tucked by plates 208 which then hold the slices together. When the loaf has reached the position shown in Fig. 7, the pusher arm 66 recedes and lifter 108 ascends, thereby laying the portion of blank B between the loaf and rollers 202 and 206 over the top of the loaf. In order to secure smooth and straight folding of the paper over the top of the loaf, a folder loop 212, Fig. 9, which extends across the blank, is moved downward. Folder loop 212 is mounted on lugs 213 which are fastened to shaft 214 actuated by a lever 215 connected through a rod 216 to a bell crank lever 217, Fig. 1, pivoted on shaft 69. Lever 217 is operated through a connecting rod 218 from a cam lever 219 and pivoted on shaft 78 and engaging with a track of cam 182. As the loaf ascends further, the paper is folded smoothly over the remaining side of the loaf. At the same time the top end folds are made by a pair of top end fold plates 220 into which the loaf is pushed in its upward motion, Figs. 12, 13, and 14. The top end fold plates 220 are so arranged as to fold the top end folds over the sides of the tucker plates 208. Thus when the lifter plate 108 reaches the level of the delivery table 221, which is supported by the brackets 205, the side folds and top end folds have been made. When the lifter plate reaches its uppermost position, the lifter screws 199 again raise the lever 201, thereby disengaging clamp roller 202 from roller 206 and leaving the paper free, but at the same time the tension roller 222 clamps the paper against guide roller 197, Fig. 11, so that the paper still has tension as it is pulled over the side and bottom of the loaf as the pusher arms 223 push the loaf from the lifter plate 108 onto the delivery table 221. Tension roller 222 is actuated from a toggle joint 224 pivoted on lever 201 and is operated when the latter is raised. Roller 222 is guided by levers 225 pivoted on studs 207. As the loaf advances on delivery table 221 it is pushed by the arms 223 along the side end fold plates 226 and the bottom end fold plates 227. Since waxed paper is generally used for wrapping bread, the present machine is arranged for sealing the paper folds by means of heat. The finished package therefore is first pushed along heater plates 228, Figs. 1 and 2, which seal the end folds, and over a bottom sealing plate 229 which is equipped with pivotally mounted heater fingers 230 provided with tension springs 231 to secure a perfect seal since the heater fingers can follow the contour of the bottom of the package.

The pusher arms 223, Figs. 1 and 2, are slidably supported by rods 232 mounted in bearing brackets 233 and 234 held by shafts 235 and 236 mounted in bearings of side frames 20 and 21. To bracket 234 is fastened the guide bar 196 heretofore referred to. Arms 223 are equipped with a lug 237 to which is fastened an endless chain 238 driven in reciprocating motion from a sprocket 239 on shaft 235 and running over an idler sprocket 240 pivoted on shaft 236. Shaft 235 carries a gear 241 actuated from a gear rack 242 held in engagement by a guide roller 243 on stud 244. Gear rack 242 receives its vertical reciprocating motion from a cam lever 245 provided with a cam roller engaging in a track of double cam 63. Cam lever 245 is pivoted at its other end on drive shaft 23. From brackets 233 and 234 is resiliently suspended a floating presser plate 246 which rests on top of the outgoing loaves for the purpose of holding down the newly sealed wrapper and thus securing a smooth top and bottom fold.

From the heater table 229 the finished packages P, which have the appearance shown in Fig. 15, are pushed onto an endless delivery belt 247 driven by a roller 248 and running over an idler roller 249. Roller 248 is mounted on a shaft 250 carrying a gear 251 driven from a gear 252 on shaft 56. Roller 249 is pivoted on shaft 253 supported by lugs 254 mounted on shafts 255 supported by lugs 256 and 257. Belt 247 is supported by a table 258 held by shafts 259 and 260.

The finished packages P on the delivery belt are guided by the end supporting belts 261 driven by pulleys 262 and running over idler pulleys 263. Pulleys 262 are mounted on shafts 264 carrying bevel gears 265, driven from bevel gears 266, Fig. 2, slidably mounted on shaft 56. Shafts 264 are supported by brackets 267 mounted on supporting bars 268. On the latter are also mounted brackets 269 carrying pivots 270 for the idler pulleys 263. The supporting bars 268 also carry the top fold plates 220 by means of studs 271, the side and bottom end fold plates 226 and 227 by means of studs 272, and the end seal plates 228 by means of studs 273. By means of lugs 274 the bars 268 furthermore carry the guide rods 275 which guide the incoming loaf on the feed table 39 and by means of brackets 276 they support the guide plates 277 for the end guide belts 261. The object of supporting all the folder plates and guide devices of the machine on the bars 268 is to facilitate the adjustment of the machine for different sizes of loaves, since with this arrangement only the two supporting bars 268 have to be moved in or out in accordance with the desired length of the package to automatically set all side end fold and guide devices. This movement is performed by turning a hand lever 278 mounted on a shaft 279 near one end of the bars 268. The latter is one half right-hand and one half left-hand threaded, each end engaging in the corresponding thread of brackets 280, and each bracket being attached to one of the supporting bars 268. Near the other end of the bars 268 another similarly threaded shaft 281 is provided which engages with brackets 282 also mounted on supporting bars 268. Both shafts 279 and 281 carry sprockets 283 which are connected by a chain 284. By simply turning hand lever 278, the two shafts 279 and 281 will therefore turn in unison and move the supporting bars 268 in or out as required by the length of the articles to be wrapped.

In order to make resetting of the slicer impossible while the pusher arm 66 is in an advanced position, as in between the blades 86, which would cause a breakage, the machine is equipped with a safety locking device consisting of a lock lever 285, Figs. 16 and 17, mounted on a stud 286 in frame 20, to which stud is fastened another lever 287 connected through a link 288 with a double lever 289 pivoted on a stud 290 and equipped with a lug 291 and a tension spring 292. Lock lever 285 engages in a notch 293 of one of the rods 101 when the slicer is in operating position, and in a notch 294 when the slicer is in non-operative position, so that the moving of the slicing device from one position to the other is possible only after disengaging lever 285 from either notch 293 or 294, as the case may be. The lever 285 is disengaged by moving it downward which is done by depressing lever 289. The lug 291 of the latter engages with a cam 295 provided with a slot 296, so that the lever 289 can be depressed only when the slot 296 of cam 295 registers with lug 291. By timing the cam 295 so that this registration takes place when the pusher arm 66 is in its starting position, the adjustment of the slicer is therefore made impossible in any other position of the pusher arm. As will be seen from examination of Figs. 16 and 17, when the lever 285 is riding on the round part of rail 101, that is when it is not in either one of the notches 293 and 294, then the lug 291 will be depressed into the notch 296 in the cam 295 which is secured to the main cam shaft 38, so that operation of the wrapping mechanism as a whole will be prevented, except when the slicer is either completely in or completely out of operating position. One particular way of securing this result has been shown and described, but it is obvious that the same result can be obtained in various ways. Applicant, therefore, does not wish to be limited to the particular form shown and described.

What is claimed is:

1. The combination with an article lifter having a guide for wrapping material, of a wrapper feed for feeding a length of wrapping material through said guide, means for raising and lowering said lifter, means for holding a portion of the wrapping material stationary while said lifter is being lowered to partially withdraw the wrapping material from said guide, mechanism for pushing an article into the portion of the material withdrawn from said guide and onto said lifter while the latter is in its lowered position to partially enwrap the wrapping material about the circumference of the article, means acting to complete the circumferential enwrapping of the article, and folder structure for folding the end flaps of the wrapping material to complete the wrapping of the article.

2. The combination with an article lifter having a guide for wrapping material, of a wrapper feed for feeding a length of wrapping material through said guide, means for raising and lowering said lifter, means for holding a portion of the wrapping material stationary while said lifter is being lowered to partially withdraw the wrapping material from said guide, mechanism for pushing an article into the portion of the material withdrawn from said guide and onto said lifter while the latter is in its lowered position to partially enwrap the wrapping material about the circumference of the article, means acting to complete the circumferential enwrapping of the article, and folder structure for folding the end flaps of the wrapping material to complete the wrapping of the article, said guide being secured to said lifter underneath the same.

3. The combination with an article lifter having a guide for wrapping material, of a wrapper feed for feeding a length of wrapping material through said guide, means for raising and lowering said lifter, means for holding a portion of the wrapping material stationary while said lifter is being lowered to partially withdraw the wrapping material from said guide, mechanism for pushing an article into the portion of the material withdrawn from said guide and onto said lifter while the latter is in its lowered position to partially enwrap the wrapping material about the circumference of the article, means acting to complete the circumferential enwrapping of the article, and folder structure for folding the end flaps of the wrapping material to complete the wrapping of the article, said wrapper feed including a pair of feed rolls cooperating to feed the wrapping material, a shaft supporting one of said rolls, means for driving said shaft in one direction, pivoted bearing brackets, a shaft on which the other feed roll is mounted having its ends supported by said brackets, intermeshing gears on said feed roll shafts, and means for swinging the brackets to separate the feed rolls and permit the end of a strip of wrapping material to be inserted between the feed rolls.

4. The combination with an article lifter having a guide for wrapping material, of a wrapper feed for feeding a length of wrapping material through said guide, means for raising and lowering said lifter, means for holding a portion of the wrapping material stationary while said lifter is being lowered to partially withdraw the wrapping material from said guide, mechanism for pushing an article into the portion of the material withdrawn from said guide and onto said lifter while the latter is in its lowered position to partially enwrap the wrapping material about the circumference of the article, means acting to complete the circumferential enwrapping of the article, and folder structure for folding the end flaps of the wrapping material to complete the wrapping of the article, said means for holding a portion of the wrapping material stationary including a guide roller, a clamp roller adapted to clamp the wrapping material to said guide roller, levers supporting said clamp roller and provided with lugs, lifter screws carried by said lifter to engage said lugs and separate said rollers when said lifter is in its upper position to permit the wrapping material to be fed between said rollers and then clamped therebetween when said lifter is lowered.

5. The combination with an article lifter having a guide for wrapping material, of a wrapper feed for feeding a length of wrapping material through said guide, means for raising and lowering said lifter, means for holding a portion of the wrapping material stationary while said lifter is being lowered to partially withdraw the wrapping material from said guide, mechanism for pushing an article into the portion of the material withdrawn from said guide and onto said lifter while the latter is in its lowered position to partially enwrap the wrapping material about the circumference of the article, means acting to complete the circumferential enwrapping of the article, and folder structure for folding the end flaps of the wrapping material to complete the wrapping of the article, said mechanism including a reciprocating plunger, and said lifter having a yieldingly mounted bottom fold plate against which the wrapping material is clamped by an article being pushed and side tucker plates supported by said lifter and adapted to tuck the sides of the wrapping material as the article is pushed onto said lifter.

6. The combination with an article lifter having a guide for wrapping material, of a wrapper feed for feeding a length of wrapping material through said guide, means for raising and lowering said lifter, means for holding a portion of the wrapping material stationary while said lifter is being lowered to partially withdraw the wrapping material from said guide, mechanism for pushing an article into the portion of the material withdrawn from said guide and onto said lifter while the latter is in its lowered position to partially enwrap the wrapping material about the circumference of the article, means acting to complete the circumferential enwrapping of the article, and folder structure for folding the end flaps of the wrapping material to complete the wrapping of the article, said means for completing the circumferential enwrapping of the article including a folder bar adapted to fold the strip of wrapping material over the top of the article, whereby the upward movement of said lifter folds the strip of wrapping material over the remaining side of the article.

7. The combination with an article lifter having a guide for wrapping material, of a wrapper feed for feeding a length of wrapping material through said guide, means for raising and lowering said lifter, means for holding a portion of the wrapping material stationary while said lifter is being lowered to partially withdraw the wrapping material from said guide, mechanism for pushing an article into the portion of the material withdrawn from said guide and onto said lifter while the latter is in its lowered position to partially enwrap the wrapping material about the circumference of the article, means acting to complete the circumferential enwrapping of the article, and folder structure for folding the end flaps of the wrapping material to complete the wrapping of the article, said folder structure including top end fold plates, side end fold plates, bottom end fold plates, and adjustable supporting bars on which said plates are mounted.

8. The combination with an article lifter having a guide for wrapping material, of means for raising and lowering said lifter, and means for clamping the wrapping material in said guide.

9. The combination with an article lifter having a guide for wrapping material, of means for raising and lowering said lifter, and means for clamping the wrapping material in said guide, said means for clamping the wrapping material including a clamp roller, an arm pivoted on said lifter and carrying said roller, a rod carried by said lifter, a tensioned arm on said rod connected to said pivoted arm to cause it to clamp the wrapping material, and a guide bar arranged to engage said tensioned arm when said lifter is in its raised position to cause said clamp roller to release the wrapping material.

10. In a combined slicing and wrapping machine, the combination with means for forwarding articles to be sliced and wrapped, of slicing means, means actuated by engagement with an article on said forwarding means to feed a predetermined length of material from a reel of wrapping material, means for severing the web of wrapping material at a suitable distance from its leading end to form a wrapper blank, means for positioning the severed wrapper blank to be engaged by a sliced article, mechanism for pushing an article from said forwarding means through said slicing means into engagement with said wrapper blank to partially enwrap it about the circumference of the sliced article, means acting to complete the circumferential enwrapping of the article, and means for folding the end flaps of the wrapper blank to complete the wrapping of the sliced article.

11. In a combined slicing and wrapping machine, the combination with means for forwarding articles to be sliced and wrapped, of slicing means, means actuated by engagement with an article on said forwarding means to feed a predetermined length of material from a reel of wrapping material, means for severing the web of wrapping material at a suitable distance from its leading end to form a wrapper blank, means for positioning the severed wrapper blank to be engaged by a sliced article, mechanism for pushing an article from said forwarding means through said slicing means into engagement with said wrapper blank to partially enwrap it about the circumference of the sliced article, means acting to complete the circumferential enwrapping of the article, and means for folding the end flaps of the wrapper blank to complete the wrapping of the sliced article, said forwarding means including a substantially horizontal conveyor, a reciprocating elevator for receiving articles directly from said conveyor at one level and lifting them to a delivery level.

12. In a combined slicing and wrapping machine, the combination with means for forwarding articles to be sliced and wrapped, of slicing means, means actuated by engagement with an article on said forwarding means to feed a predetermined length of material from a reel of wrapping material, means for severing the web of wrapping material at a suitable distance from its leading end to form a wrapper blank, means for positioning the severed wrapper blank to be engaged by a sliced article, mechanism for pushing an article from said forwarding means through said slicing means into engagement with said wrapper blank to partially enwrap it about the circumference of the sliced article, means acting to complete the circumferential enwrapping of the article, and means for folding the end flaps of the wrapper blank to complete the wrapping of the sliced article, said means for feeding the wrapping material including a pair of cooperating feed rolls, a rotating drive shaft, mechanism for driving said feed rolls from said drive shaft, and a feeler arranged to engage the advancing articles in said forwarding means and connected to said mechanism to control the same.

13. In a combined slicing and wrapping machine, the combination with means for forwarding articles to be sliced and wrapped, of slicing means, means actuated by engagement with an article on said forwarding means to feed a predetermined length of material from a reel of wrapping material, means for severing the web of wrapping material at a suitable distance from its leading end to form a wrapper blank, means for positioning the severed wrapper blank to be engaged by a sliced article, mechanism for pushing an article from said forwarding means through said slicing means into engagement with said wrapper blank to partially enwrap it about the circumference of the sliced article, means acting to complete the circumferential enwrapping of the article, and means for folding the end flaps of the wrapper blank to complete the wrapping of the sliced article, said severing means including a ledger plate, a knife, a cam, means for rotating said cam, mechanism actuated by said cam to cause said knife to cut off the wrapping material on said ledger plate, said mechanism including a yieldable connection, and manually operable means for actuating said knife to sever the wrapping material when it is desired to cut the wrapping material while the rotation of said cam has stopped.

14. In a combined slicing and wrapping machine, the combination with means for forwarding articles to be sliced and wrapped, of slicing means, means actuated by engagement with an article on said forwarding means to feed a predetermined length of material from a reel of wrapping material, means for severing the web of wrapping material at a suitable distance from its leading end to form a wrapper blank, means for positioning the severed wrapper blank to be engaged by a sliced article, mechanism for pushing an article from said forwarding means through said slicing means into engagement with said wrapper blank to partially enwrap it about the circumference of the sliced article, means acting to complete the circumferential enwrapping of the article, and means for folding the end flaps of the wrapper blank to complete the wrapping of the sliced article, said slicing means including a slicer frame, oscillating knife frames carried by said slicer frame, slicing knives supported on said knife frames, a motor carried by said slicer frame, eccentrics mounted on the shaft of said motor and connected to said knife frames to oscillate the same, manually operable means for moving said slicer frame in and out of operative position, and means for locking said slicer frame in operative or non-operative position.

15. The combination with an article conveyor operating continuously to convey articles sidewise in spaced relation, of a slicer and wrapper folding means arranged at levels higher than said article conveyor, a wrapper feed, means for receiving the articles from said article conveyor and transferring them to said slicer and folding means, and a delivery conveyor arranged to receive the sliced and wrapped articles from said folding means and carry them to a point where they can be removed by the same operator that feeds the article conveyor.

16. Means for folding and heat sealing the ends of a wrapper enclosing an article and having its end flaps overhanging the ends of the article, comprising a pair of supporting bars, means for relatively adjusting said bars, folding plates for folding the top, side and bottom end flaps of the wrapper mounted on each of said bars, a heater plate carried by each of said bars and adapted to heat seal the folded ends of the wrapper, an endless supporting belt carried by each of said bars and adapted to engage the ends of the finished packages to guide them, and adjustable means for driving said belts, whereby the folding plates, heater plate and endless belts may be simultaneously adjusted.

17. The combination with means for folding the overhanging end flaps of a wrapper enclosing an article, of mechanism for moving the article through said means, said mechanism including a pair of sprockets, a chain running over said sprockets, a gear fixedly connected to one of said sprockets, a reciprocating rack meshing with said gear, and a pusher carried by the lower run of said chain and adapted to advance the package through said folding means.

18. In a wrapping and slicing machine, the combination with article wrapping means, of article slicing means, and mechanism for moving said slicing means in and out of position to cooperate with said wrapping means.

19. In a wrapping and slicing machine, the combination with article wrapping means, of article slicing means, and mechanism for moving said slicing means in and out of position to cooperate with said wrapping means, said mechanism including rails mounting said slicer.

20. In a wrapping and slicing machine, the combination with article wrapping means, of article slicing means, and mechanism for moving said slicing means in and out of position to cooperate with said wrapping means, said wrapping means and said slicing means each having guides acting on opposite ends of the articles, and said mechanism including devices supporting said slicer for movement into and out of a position in which the wrapping and slicing guides are in alignment.

21. In a wrapping and slicing machine, the combination with article wrapping means, of article slicing means, and mechanism for moving said slicing means in and out of position to cooperate with said wrapping means, and means for locking said slicing means in position.

22. In a wrapping and slicing machine, the combination with article wrapping means, of article slicing means, mechanism for moving said slicing means in and out of position to cooperate with said wrapping means, means for locking said slicing means in position, and devices connected to the wrapping means for preventing movement of the slicer into wrapping position when the wrapping machine parts are in interfering position.

23. The combination with an article lifter, of means for feeding and cutting a wrapper sheet, and means including devices on the lifter for spreading the cut wrapper sheet in a generally vertical direction, and devices for pushing an article in a generally horizontal direction into the outspread sheet.

24. The combination with an article lifter, of means for feeding and cutting a wrapper sheet, and means including devices on the lifter for spreading the cut wrapper sheet in a generally vertical direction, and devices for pushing an article in a generally horizontal direction into the outspread sheet, said spreading means including a clamp arranged to act on one end of the cut sheet.

25. The combination with a vertically reciprocable article lifter, of end folders mounted on said lifter, means for pushing an article onto said lifter and between said folders, and means for spreading a cut wrapper between said article and said lifter prior to movement of the article onto the lifter.

26. The combination with bread wrapping means, of a bread slicing unit, devices for feeding bread loaves to said unit and thence to the wrapping means, and mechanism mounting said unit for movement in and out of slicing position, to adapt the machine to wrap sliced or unsliced bread as desired.

27. The combination with bread wrapping means, of a bread slicing unit, devices for feeding bread loaves to said unit and thence to the wrapping means, and mechanism slidably mounting said unit for movement in and out of slicing position, to adapt the machine to wrap sliced or unsliced bread as desired.

28. The combination with bread wrapping means, of a bread slicing unit, devices for feeding bread loaves to said unit and thence to the wrapping means, mechanism mounting said unit for movement in and out of slicing position, to adapt the machine to wrap sliced or unsliced bread as desired, and rotatable screw means connected to the wrapping machine and the unit operable to cause said movement.

29. In a bread slicing and wrapping machine, the combination with a bread slicer, of an infeed for continuously advancing bread loaves in spaced relation to said slicer, bread elevating means on the opposite side of said slicer from said infeed, bread wrapping means cooperating with said elevating means for wrapping the bread loaves, and a delivery conveyor for said wrapped loaves parallel to said infeed and passing over said slicer to deliver the loaves at a point near that at which the loaves entered the machine.

30. In a wrapping machine, the combination with an article lifter having a guide for wrapping material, and means cooperating with said lifter and guide to circumferentially enwrap an article in said material.

31. In a wrapping machine, the combination with an article lifter having a vertical reciprocating movement, of a relatively stationary clamp, means for feeding a length of wrapping material to said clamp, means on the lifter coacting with said clamp and engaging said wrapping material to spread the same as the result of movement of the lifter, means for pushing an article into the wrapper spread by said lifter and onto said lifter while the lifter is in a position below said clamp whereby the paper is draped over the top of said article as the lifter moves upwardly, and means for pushing the article off said lifter and over said clamp to complete the circumferential enwrapping of the article in said wrapper.

32. In a wrapping machine, the combination with an article lifter having an up and down motion, a wrapping material feed, and means coacting with said feed and said lifter to spread the wrapper sheet as a result of the downward movement of said lifter.

33. In a wrapping machine, the combination with a first feedway leading into the machine, of a second feedway extending in a plane substantially parallel to the first way on a different level for feeding articles out of the machine, a third feedway also extending in a plane substantially parallel to the first and second feedway but offset in a direction perpendicular to its length from either, a slicing means cooperating with said third feedway to slice articles thereon, a pusher for pushing articles along said third feedway and through said slicer, and means for successively moving the articles from the forward end of the first feedway onto said third feedway in front of said pusher for movement thereby through said slicer, and means for wrapping the sliced article and transferring it to said second way.

34. In an article slicing and wrapping machine, a pair of spaced side frames extending lengthwise of the machine, article wrapping means mounted between said side frames, an article slicing unit, one of said side frames having an opening therein to admit said unit, and means mounting said slicer for movement through said opening transversely of said frame into and out of a position in which it cooperates with said wrapping and transferring means to slice the articles.

35. In a wrapping machine, the combination with a vertically reciprocable lifter, of means for pushing an article onto said lifter, mechanism for supporting a cut sheet of wrapping material in vertical position between said pushing means and said lifter, whereby said pushing means will push an article into the sheet and onto said lifter, and folders for folding in the forward edge portion of the sheet on the ends of the article as the article is pushed onto said lifter, said mechanism including a gripper supporting the sheet by its upper edge.

36. In a wrapping machine, the combination with a vertically reciprocable lifter, of means for pushing an article onto said lifter, mechanism for supporting a cut sheet of wrapping material in vertical position between said pushing means and said lifter, whereby said pushing means will push an article into the sheet and onto said lifter, and folders for folding in the forward edge portion of the sheet on end of the article as the article is pushed onto said lifter, said mechanism including a gripper supporting the sheet by its upper edge, and means holding said folders stationary during the folding operation.

37. In a wrapping machine, the combination with a vertically reciprocable lifter, of means for pushing an article onto said lifter, mechanism for supporting a cut sheet of wrapping material in vertical position between said pushing means and said lifter whereby said pushing means will push an article into the sheet and onto said lifter, said mechanism including a gripper supporting the sheet by its upper edge.

38. In a wrapping machine, the combination with a lifter table, of means for pushing an article onto said lifter table, means for feeding wrapper material from a continuous web, means for cutting a wrapper length from said web while in one plane, means for carrying the cut length to a position in another plane between the lifter table and said pushing means whereby said pushing means will push the article into the sheet and onto the lifter.

39. In a wrapping machine, the combination with a vertically reciprocable lifter, of means for pushing an article onto said lifter, mechanism for supporting a cut sheet of wrapping material between said pushing means and said lifter whereby said pushing means will push an article into the sheet and onto said lifter, and means for wrapping the sheet circumferentially about the article, and successively folding in the forward end flaps on the ends of the article, folding down the upper end flaps on the forward end flaps, folding in the rear end flaps on the upper end flaps and lastly folding up the bottom end flaps on the rear end flaps.

40. Bread slicing means including a slicer frame, oscillating knife frames carried by said slicer frame, slicing knives supported on said knife frame, a motor carried by said slicer frame, eccentrics mounted on the shaft of said motor and connected to said knife frames to oscillate the same, manually operable means for moving said slicer frame in and out of operative position, and means for locking said slicer frame in operative or non-operative position.

41. In a wrapping and slicing machine, the combination with article wrapping means, of article slicing means, mechanism moving said slicing means into and out of operative position to cooperate with said wrapping means, and devices coacting with said slicer and said wrapping means to prevent operation of said wrapping means when said slicing unit is in intermediate position, not fully in or out of operating position.

42. In a wrapping machine, the combination with a vertically reciprocating lifter, of means for pushing an article onto the lifter when the latter is in lowered position, mechanism for supporting wrapping material in vertical position between said pushing means and said lifter, whereby said pushing means will push the article into said material and onto the lifter, said mechanism including a gripper holding the material by its upper edge and positioned to permit the article to pass beneath it and onto said lifter, and a device arranged to exert pressure from above on a portion of wrapper material between the gripper and the article to keep the wrapper material under tension and to drape the same about the article as the lifter moves to its upper position.

43. In a wrapping machine, the combination with a vertically reciprocable lifter, of means for pushing an article onto said lifter when the latter is in lowered position, mechanism for supporting wrapping material in vertical position between said pushing means and said lifter whereby said pushing means will push the article into said material and onto said lifter, said mechanism including a gripper holding the material by its upper edge and positioned to permit the article to pass beneath it and onto said lifter, and a device arranged to exert pressure from above on a portion of the wrapping material between the gripper and the article to drape the wrapper material about the article as the lifter moves to its upper position, said device including a vertically movable elongated bar extending alongside the lifter.

LESTER FERENCI.